United States Patent [19]

Blount

[11] 4,159,369

[45] Jun. 26, 1979

[54] PROCESS FOR THE PRODUCTION OF POLY (URETHANE SILICATE) CELLULAR SOLID/SOLID PRODUCTS

[76] Inventor: David H. Blount, 5450 Lea St., San Diego, Calif. 92105

[21] Appl. No.: 884,135

[22] Filed: Mar. 7, 1978

Related U.S. Application Data

[63] Continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.² .............................................. C08J 9/00

[52] U.S. Cl. .............................. 521/155; 260/28 R; 260/31.2 R; 260/31.8 W; 260/33.6 UB; 260/858; 260/859 R; 521/82; 521/83; 521/99; 521/114; 521/172; 521/174; 528/11; 528/12; 528/14; 528/18; 528/26; 528/28; 528/44; 528/57; 528/76; 528/425

[58] Field of Search ...... 260/2.5 AM, 2.5 A, 2.5 AK, 260/2.5 AT, 2 S, 46.5 E, 77.5 AM, 77.5 AP, 77.5 AN, 77.5 AS, 31.2 R, 31.8 S, 31.8 W, 33.6 UB, 28 R, 858, 859 R; 521/82, 83, 99, 114, 155, 172, 174; 528/11, 12, 14, 18, 26, 28, 44, 57, 76, 425

[56] References Cited

U.S. PATENT DOCUMENTS

| 4,072,637 | 2/1978 | Blount | 260/2.5 A |
|---|---|---|---|
| 4,097,424 | 6/1978 | Blount | 260/2.5 A |

*Primary Examiner*—Melvyn I. Marquis

[57] ABSTRACT

Liquid isocyanate-terminated polyurethane prepolymers will react chemically with oxidated silicon compounds to produce isocyanate-terminated polyurethane silicate prepolymers which may be cured with a catalyst such as water.

15 Claims, No Drawings

PROCESS FOR THE PRODUCTION OF POLY (URETHANE SILICATE) CELLULAR SOLID/SOLID PRODUCTS

CROSS-REFERENCE TO RELATED APPLICATIONS

This appliction is a continuation-in-part of my copending U.S. patent appliction, Ser. No. 663,924, filed Mar. 4, 1976, now Pat. No. 4,097,424 which is a continuation-in-part of my earlier U.S. patent application Ser. No. 599,000, filed July 7, 1975, now U.S. Pat. No. 4,072,637 which is a continuation-in-part of my earlier U.S. patent application Ser. No. 262,485, filed June 14, 1972, now abandoned, which is a continuation-in-part of my earlier U.S. patent application Ser. No. 71,628, filed Sept. 11, 1970 now abandoned.

BACKGROUND OF THE INVENTION

This invention relates to a process for the production of poly (urethane silicate) cellular solid or solid product by reacting a liquid isocyanate-terminated polyurethane prepolyer with a fine granular oxidated silicon compound. The prepolymer may be cured with a catalyst such as water. The poly (urethane silicate) products may be quite varied in physical properties; they may be solid or porous, rigid or elastomeric, and the porous products may be rigid or soft and flexible.

The poly (urethane silicate) cellular solid or solid products produced by this method may be utilized as thermal insulating material, noise insulating material, shock-resistant packing, cushions, as coating agents, as adhesives, as casting material. as constructional components of a building, etc. The products have improved heat and flame resistant properties.

In U.S. patent application Ser. No. 663,924, filed on Mar. 4, 1976 now U.S. Pat. No. 4,097,424 and U.S. patent application Ser. No. 599,000, now U.S. Pat. No. 4,072,637 silicon acids are reacted with polyisocyanate compounds, but not with liquid isocyanate-terminated polyrethane prepolymers. The reaction of oxidized silicon compound with polyurethanes and isocyanates were listed in U.S. patent application Ser. No. 71,628, filed Sept. 11, 1970 by David H. Bount now abandoned. The oxidized silicon compounds were called "oxidized silicate" and included alkali metal silicates, alkaline earth metal silicates, mono-alkali metal silicic acid, mono-alkaline earth silicic acid and silicic acid.

The oxidated silicon compounds may be produced by any of the commonly known methods. They are preferred to be in a fine granular form. The oxidated silicon compounds include hydrated silica, hydrated silica containing Si-H bonds (siliconformic acid), alkali metal silicates, alkaline earth metal silicates and natural occuring oxidated silicon compounds with free silicic acid radicals. The hydrated silica includes the various silicon acids such as dry silicic acid gel, orthosilicic acid, metasilicic and, monosilandiol, polysilicoformic acid, orthosilicoformic acid (Leucone), silicoformic acid and silica sol. Cement, such as Portland cement, contains oxidated silicon compounds and may be used in this invention.

The oxidated silicon compounds may be reacted with alkali metal compounds such as sodium hydroxide, potassium hydroxide, sodium carbonate, potassium carbonate and lithium hydroxide to produde alkali metal silicates and mono-alkali metal silicates which may be used in this invention.

As is known in the art, the isocyanate-terminated liquid polyurethane prepolymers may be made by reacting organic polyisocyanates in molar excess with hydroxyl containing or carboxyl containing polyesters, polyesters, polysulfides, polybutadienes, butadiene-acrylonitrile copolymer and butadiene-styrene copolymer, polyepichlorohydrin, polythioethers, polyester amides, polyacetals, urea formaldehyde resins, polycarbonates, organic hydroxyl silicate compounds, organic polyester silicates, and other polyols. The polyesters may be produced by any of the commonly known methods. The polyether polyols are useful in making polyurethane prepolymers, and the methods to produce them as well known in the art. The hydroxyl-group containing polysulfide polymers may be utilized to produce polyurethane prepolymers.

Any suitable polyisocyanate may be reacted with the above described hydroxyl containing polymers to prepare the isocyanate-terminated methane prepolymers such as the arylene polyisocyanates, alkylene polyisocyanates and triphenylmethane triisocyanate. Toluene diisocyanates are preferred, especially a mixture of the 2,4-isomer and 2,6-isomer. Phosgenation product of aniline-formaldehyde condensation may be used.

Plasticizers, fillers, curing rate modifiers, pigments, extenders and the like may be added to the polyurethane prepolymer or may be added at the time of curing and may be in the amount from 5% to 50% by weight, based on the prepolymer. Plasticizers may include benzoate ester, phthalate esters, dipropylene glycol benzoate, dodecyl phthalate and propylene glycol phthalate. Extenders such as high boiling cold tar distillates, mineral oil, poly (alpha-methyl styrene) polymers, mercapto-terminated liquid polysulfide polymers, paraffin oil and sulphonated caster oil may be used. Finely divided fillers such as alkali metal silicate, alkaline earth metal silicates, ammonium silicate, metal oxides, metal hydroxides, metal carbonates, chalk, heavy spar, gypsum anhydrite, clay, kaolin, silica and mixtures thereof may be used in this invention.

In the production of certain foams, it is advisable to add blowing agents. These are inert liquids with boiling points ranging from −25° to 80° C. and preferably from −15° to 40° C. The organic blowing agents are used in quantities of from 0% to 30% by weight, based on the reaction mixture.

The organic blowing agents such as acetone, ethyl acetate, methanol, ethanol, halogenated alkanes, e.g. methylene chloride, chloroform, ethylidene chloride, vinylidene chloride, monofluorotrichloromethane, chlorodiflouromethane, dichlorodiflouromethane, butane, hexane, diethylether, compounds which decompose at temperatures above room temperature with liberation of gases, e.g. nitrogen, such as azo compounds and azoisobutyric acid nitrile may be used in this process.

Other curing catalysts in place of or combined with water may be utilized as the catalyst to produce foam products from the liquid isocyanate-terminated polymethane prepolymers and oxidized silicon compounds. These catalysts are commonly known in the arts such as tertiary amines, silaamine, basic compounds which contain nitrogen, e.g. tetraalkylammonium hydroxide, alkali metal hydroxides, alkali metal phenolates, alkali metal alcoholates, hexahydrotriazines, tin organo-metallic and mixtures thereof. Acetic acid may be used as the catalyst. These catalysts are generally used in a quantity of from 0.001% to 50% by weight, based on the weight of the polyurethane prepolymer.

Suitable emulsifiers and foam stabilizers may also be used according to this invention. Suitable emulsifiers are, e.g. the sodium salts of ricinoleic sulphonates or of fatty acids, or salts of fatty acids with amines, e.g. oleic acid diethylamine or stearic acid diethanolamine, or alkali metal or ammonium salts of sulphonic acids and fatty acids. These additives are preferably used in quantities of from 0% to 20% by weight, based on the reaction mixtures.

Suitable foam stabilizers are mainly water soluble polyether siloxanes and those described, in U.S. Pat. No. 3,629,308. These additives are preferably used in quantities of from 0% to 20%, by weight, based on the reaction mixture.

Further examples of surface active additives, foam stabilizers, cell regulators, negative catalysts, stabilizers, flame retarding substances, plasticizers, dyes, fillers and fungicidal and bacteriocidal substances and details about methods of using these additives and their actions may be found in Kunststoff-Handbuch, Volume VI, published by Vieweg and Hochtlen, Carl-Hanser-Verlag, Munich 1966, e.g. on pages 103 to 113.

The polyurethane prepolymer with only two terminal isocyanate groups tend to produce non-porous products when reacted with an oxidated silicon compound and then cured by a catalyst. The polyurethane prepolymer with 3 or more terminal isocyanate groups tend to produce cellular products when reacted with an oxidated silicon compound and then cured with a curing catalyst. Mixtures of polyurethane prepolymer with 3 and 4 terminal isocyanate groups, when reacted with an oxidated silicon compound and then cured, produce a tough, strong, fine cellular, lightweight poly (urethane silicate) product which is useful for structural applications. The three and four terminal isocyanate groups may be mixed to contain from 20% to 80% by weight of the prepolymer having three isocyanate groups, and from 80% to 20% by weight of the prepolymer having four isocyanate groups.

Any suitable polyisocyanate may be used to produce the liquid isocyanate-terminated polyurethane prepolymers, for example, arylene polyisocyanates such as tolylene, metaphenylene; 4-chlorophenylene-1,3, methylene-bis-(phenylene-4-), biphenylene-4,4'-, 3,3'-dimethoxy-biphenylene-4,4'-, 3,3'-diphenylbiphenylene-4,4'-, naphthalene-1,5-, and tetrahydro-napthalene-1,5-diisocyanates and triphenylmethane triisocyanate, alkylene polyisocyanates such as ethylene, ethylidene, propylene-1,2-, butylene-1, 4-butylene-1,3-, hexylene-1,6-, decamethylene-1,10-, cyclohexylene-1,2-, cyclohexylene-1,4-, and methylene-bis-(cyclohexyl-4,4'-) diisocyanates. Phosgenation products of aniline-formaldehyde condensation may be used. Polyisothiocyanates, inorganic polyisothiocyanates, polyisocyanates which contain carbodiimide groups as described in German Pat. No. 1,092,007 and polyisocyanates which contain urethane groups, allophanate groups, isocyanurate groups, urea groups, imide groups or biuret groups may be used to produce the liquid isocyanate-terminated polyurethane prepolymers.

The preferred method to produce poly(urethane silicate) solid/cellular solid product is to mix 2 to 6 parts by weight of a liquid isocyanate-terminated polyurethane prepolymer with 1 to 2 parts by weight of a fine granular oxidated silicon compound. The mixture is then heated to 20° C. to 80° C., preferably 40° C. to 80° C. while agitating for 10 to 30 minutes thereby producing a poly(urethane silicate) prepolymer. A curing catalyst, such as water, is added in the amount of 0 to 1 part by weight to the prepolymer and is mixed thoroughly then gently agitated for 3 to 15 minutes until the mixture solidifies or begins to expand. It will expand 3 to 12 times its original volume to produce a poly(urethane silicate)solid/cellular solid product.

An alkali metal carbonate or hydroxide in the amount of 1% to 10% by weight, percentage based on weight of the oxidized silicon compound, may be added with the oxidated silicon compound to enhance the chemical reaction between the polyurethane prepolymer and the oxidated silicon compound. Alkali metal silicates may be used in place of the oxidation silicon compounds.

Plasticizers, fillers, curing rate modifiers, pigments, extenders, flame retarding substances, blowing agents, fungicidal and bacteriocidal agents, foam stabilizers, etc. may be added to the poly(urethane silicate) prepolymer in the amount 5% to 50% by weight, based on the prepolymer.

Surface active additives, emulsifiers, and foam stabilizers may be added to the curing catalyst. In some cases the foaming is started by heating the poly(urethane silicate) prepolymer to 80° to 100° C.

In the production of certain poly(urethane silicate) solid or cellular solid product it is necessary to have a longer curing time, and in certain cases, it is necessary to heat the product at 80° C. to 120° C. for 1 to 3 hours to finish curing the product.

The object of the present invention is to provide a novel process to produce poly(urethane silicate) solid/cellular solid products from reacting liquid isocyanate-terminated polyurethane prepolymers and oxidated silicon compounds. Another object and advantage of the present invention is to utilize low cost and ready availability of oxidated silicon compound to react with the liquid isocyanate-terminated polyurethane prepolymers. An other object is to produce relatively low cost, rigid, elastomeric and cellular solid poly(urethane silicate) products having good physical properties. Another object of the present invention is to produce poly(urethane silicte) solid/cellular solid products with improved flame resistant properties. Still a further object is to provide a novel, relatively low cost, rigid, fine cellular, light-weight poly(urethane silicate) product which may be used for structural purposes. Still another object is to produce novel poly(urethane silicate) solid/cellular solid products that are soluble in organic solvents and may be utilized as a coating agent for wood and metal.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of poly(urethene silicate) solid/cellular solid products. Parts and percentages are by weight unless otherwise indicated.

EXAMPLE 1

About 2 parts by weight of toluene diisocyanate (80% 2,4-isomer and 20% 2,6-isomer) and 2 parts by weight of polyethylene glycol (mol. wt. 480 to 520) are mixed then agitated for 30 to 120 minutes thereby producing a liquid isocyanate terminated polyurethane prepolymer. One part by weight of fine granular hydrated silica and 2 parts by weight of the prepolymer are mixed then heated to 40° to 80° C. while agitating for 10 to 30 minutes at ambient pressure thereby producing a poly(urethane silicate) prepolymer. About 0.2 part by weight of water is added, and in 3 to 15 minutes the mixture begins to expand. It expands 3 to 12 times its original volume thereby producing a semi-rigid poly(urethene silicate) cellular solid.

EXAMPLE 2

About 2 parts by weight of the liquid isocyanate-terminated polyurethane prepolymer as produced in Example 1 and 1 part by weight of fine granular sodium silicate pentahydrate are mixed. The mixture is then heated to 40° C. to 80° C. while agitating at ambient pressure for 10 to 30 minutes thereby producing a poly(urethane silicate) prepolymer. The prepolymer is then heated to 80° to 100° C. and the mixture begins to expand. It expands 3 to 12 times its original volume thereby producing a tough, rigid poly(urethane silicate) cellular solid.

EXAMPLE 3

About 2 parts by weight of the liquid isocyanate-terminated polyurethane as produced in Example 1 and 1 part by weight of fine granular magnesium silicate are mixed then heated to 40° C. to 80° C. while agitating at ambient pressure for 10 to 30 minutes thereby producing poly(urethane silicate) prepolymer. About 0.3 part by weight of glacial acetic acid is added to the prepolymer while agitating, and the mixture begins to expand in 3 to 15 minutes thereby producing a rigid, self-standing, tough, poly(urethane silicate) cellular solid product.

EXAMPLE 4

About 3 parts by weight of the liquid isocyanate-terminated polyurethane as produced in Example 1 and 1 part by weight of fine granular potassium silicate pentahydrate are mixed then heated to 40° C. to 80° C. while agitating at ambient pressure for 10 to 30 minutes, thereby producing poly(urethane silicate) prepolymer. About 1 part by weight of water is added to the prepolymer and mixed thoroughly. The mixture begins to expand in 3 to 15 minutes and expands 3 to 12 times its original volume thereby producing a semi-rigid, tough poly(urethane silicate) cellular solid product.

EXAMPLE 5

About 4 parts by weight of the liquid isocyanate-terminated polyurethane prepolymer as produced in Example 1 and 1 part by weight of fine granular hydrated silica containing Si-H bonds (silicoformic acid) are mixed then heated to 40° C. to 80° C. while agitating at ambient pressure for 10 to 30 minutes thereby producing poly(urethane silicate) prepolymer. About 2 parts by weight of an aqueous solution of sodium silicate containing 0.8 part by weight of sodium silicate is added to the prepolymer and thoroughly mixed. The mixture begins to expand in 3 to 15 minutes. It expands 3 to 12 times its original volume thereby producing a tough, rigid poly(urethane silicate) cellular solid product.

EXAMPLE 6

About 1 mol of fine granular silica, about 1 mol of an alkali metal hydroxide, sodium hydroxide, and about an equal weight of water are mixed then heated at 80° to 100° C. for 10 to 30 minutes while agitating at ambient pressure for 10 to 30 minutes thereby producing a gray colored powder, mono-sodium silicate.

About 3 parts by weight of the liquid isocyanate-terminated polyurethane prepolymer as produced in Example 1 and 2 parts by weight of the mono-sodium silicate are thoroughly mixed then heated to 80° to 100° C. and the mixture expands 3 to 12 times its original volume thereby producing a tough, rigid, poly(urethane silicate) cellular solid.

EXAMPLE 7

About 1 mol of fine granular dried silicic acid gel (mols based on silicon oxide content), 1 mol of potassium hydroxide and about equal weight of water are mixed. The silicic acid gel (hydrated silica) goes into solution and is then heated to 80° to 100° C. while agitating for 10 to 30 minutes until the water is evaporated thereby producing fine granular mono-potassium silicate.

About 2 parts by weight of the liquid isocyanate-terminated polyurethane prepolymer as produced in Example 1 and 1 part by weight of the mono-potassium silicate are mixed then heated to 40° C. to 80° C. while agitating for 10 to 30 minutes thereby producing a poly(urethane silicate) prepolymer. About 1 part by weight of water containing 0.01% stannous octoate, 0.02% triethylene-diamine, 5% sulphonated castor oil, 2% ammonium oleate and 0.5% paraffin oil are added. The mixture is gently agitated for 3 to 15 minutes until the mixture begins to expand. The mixture expands 6 to 8 times its original volume, thereby producing a tough, rigid, poly(urethane silicate) cellular solid product. This product is tough and strong enough to use as constructional components of a building.

EXAMPLE 8

About 2 parts by weight of castor oil and 2 parts by weight of toluene diisocyanate (80% 2,4-isomer and 20% 2,6-isomer) are mixed then heated to 60° to 80° C. for about 30 to 120 minutes thereby producing an isocyanate-terminated polyurethane prepolymer.

About 2 parts by weight of the prepolymer and one part by weight of fine granular hydrated silica are mixed then heated to 40° C. to 80° C. while agitating for 10 to 30 minutes thereby producing a poly(urethane silicate) prepolymer. About 0.5 part by weight of dilute acetic acid (3N) is mixed with the prepolymer thoroughly, and in 3 to 15 minutes a tough, poly(urethane silicate) cellular solid product is produced.

EXAMPLE 9

About 2 parts by weight of the isocyanate-terminated polyurethane prepolymer as produced in Example 8, 0.5 part by weight of fine granular hydrated silica and 0.5 part by weight of granular sodium metasilicate pentahydrate are mixed then heated to 40° to 80° C. while agitating for 10 to 30 minutes thereby producing a poly(urethane silicate) prepolymer. About 1 part by weight water, containing 2% soap, 5% silica and 5% magnesium hydroxide is mixed thoroughly with the prepolymer then heated to 80° to 100° C. for 3 to 15 minutes thereby producing a white, tough, poly(urethane silicate) solid product.

EXAMPLE 10

About 3 parts by weight of the isocyanate-terminated polyurethane prepolymer as produced in Example 8 and 1 part by weight of dry, fine granular sodium silicate are mixed then heated to 40° C. to 80° C. for 10 to 30 minutes thereby producing poly(urethane silicate) prepolymer. The mixture is then heated to 80° to 100° C. for 3 to 15 minutes thereby producing a white, tough, poly(urethane silicate) solid product. The product is then placed in water and the salt (sodium carbonate) goes into solution and is removed. The poly(urethane silicate) prepolymer may be poured into sheets and cured by heat.

EXAMPLE 11

About 2 parts by weight of sodium hydroxide flakes, 1 part by weight of fine granular silica and 3 parts by weight of water are mixed then heated to 80° to 100° C. while agitating at ambient pressure for 10 to 30 minutes, thereby producing a mixture of monosodium silicate, sodium silicate and silica.

About 1 part by weight of the alkali silicate mixture and 2 parts by weight of the isocyanate-terminated polyurethane prepolymer as produced in Example 8 are mixed then agitated while heating to 40° C. to 80° C. for 10 to 30 minutes thereby producing a poly(urethane silicate) prepolymer. About 1 part by weight of water containing 10% methanol, 3% by weight of detergent, 5% by weight of sulphonated castor oil and 2 parts by weight of the poly(urethane silicate) prepolymer are mixed thoroughly. The mixture begins to expand in 3 to 15 minutes and expands 3 to 12 times its original volume thereby producing a tan, tough, poly(urethane silicate) cellular solid.

EXAMPLE 12

About 4 parts by weight of the isocyanate-terminated polyurethane prepolymer as produced in Example 8, 0.1 part by weight of sodium carbonate, 1 part by weight of a mixture of fine granular hydrated silica and hydrated silica containing Si-H bonds (silicoformic acid) are mixed then heated to 40° to 80° C. while agitating at ambient pressure for 10 to 30 minutes thereby producing a poly(urethane silicate) prepolymer. About 1 part by weight of water containing 25% by weight of sodium silicate, 2% by weight of soap, 5% by weight of magnesium oxide and 4% by weight of sodium salt of phenol are mixed with 5 parts by weight of the poly(urethane silicate) prepolymer. The mixture is then heated to 80° to 100° C., and the mixture begins to expand. It expands 3 to 12 times its original volume thereby producing a tough, rigid poly(urethane silicate) cellular solid.

EXAMPLE 13

About 3 parts by weight of a liquid isocyanate-terminated polyurethane prepolymer, which was produced by mixing about equal parts by weight of toluene diisocyanate and polyethylene glycol (380 to 420 mol. wt.) and 1 part by weight of fine granular hydrated silica are mixed then heated to 40° to 80° C. for 10 to 30 minutes thereby producing a poly(urethane silicate) prepolymer. To this prepolymer two parts by weight of a mixture of glycerol silicate and poly(glycerol silicate) polymer, containing about 20% water by weight are added and mixed thoroughly. The mixture is gently agitated at ambient temperature for 5 to 15 minutes until the mixture begins to expand. The mixture expands 8 to 10 times its original volume and is cured within 30 to 60 minutes, thereby producing a rigid, tough, white poly(urethane silicate) cellular solid.

The organic hydroxyl silicate compound and polymer is produced by mixing 1 to 2 mols of a polyol with 1 mol of hydrated silica or silica and heated in the presence of an alkali catalyst for 20 to 40 minutes.

EXAMPLE 14

About 3 parts by weight of an isocyanate-terminated polyurethane prepolymer, produced by reacting a polyester, having about 2,000 to 2,200 molecular weight and produced by condensation of a mixture of about 70% ethylene glycol and 30% propylene glycol with equimolar amount of adipic acid, was reacted with tolylene diisocyanate to produce a polyurethane prepolymer having an NCO content of about 3.5%. About 1 part by weight of sodium metasilicate pentahydrate granules is mixed with the prepolymer then heated to 40° to 80° C. while agitating for 10 to 30 minutes to produce a poly(urethane silicate) prepolymer. The prepolymer is then heated to 80° to 100° C. and in 3 to 15 minutes a white, tough poly(urethane silicate) solid elastomer is produced.

EXAMPLE 15

About 3 parts by weight of an isocyanate-terminated polyurethane prepolymer, produced by reacting about 3 parts by weight of polypropylene glycol (mol. weight of 400 to 500) with 2 parts by weight of toluene diisocyanate (HYLENE TM), 1 part by weight of fine granular hydrated silica, 0.1 part by weight of sodium hydroxide, and 0.25 part by weight of fine granular silica are mixed then heated to 40° C. to 80° C. while agitating for 10 to 30 minutes thereby producing a poly(urethane silicate) prepolymer. About 1 part by weight of water, containing 20% by weight of ethylene glycol, 2% by weight of soap and 0.01% by weight of triethylamine, are mixed with the 4 parts by weight of the prepolymer and is gently agitated for 3 to 15 minutes until the mixture begins to expand, thereby producing a semi-rigid, poly(urethane silicate) solid xerosol.

EXAMPLE 16

About 3 parts by weight of a liquid isocyanate-terminated polyurethane prepolymer (produced by reacting a polyester resin, containing 4 parts by weight of ethylene glycol, 1 part by weight of propylene glycol and an equimolar amount of adipic acid and has a mol weight of about 1800, with methylene bis-phenyl diisocyanate) is added to about 0.5 part by weight of dipropylene glycol dibenzoate; then about 1 part by weight of dry granular sodium silicate is added to the mixture. The mixture is then heated to 40° to 80° C. while agitating for 10 to 30 minutes thereby producing a poly(urethane silicate) prepolymer. About 0.5 part by weight of water, containing 0.01% by weight of triethylenediamine, 0.01% stannous octoate and 5% magnesium oxide, is mixed with the poly(urethane silicate) prepolymer. The mixture is heated to 80° to 100° C. while gently agitating for 3 to 15 minutes thereby producing a white, tough poly(urethane silicate) solid product.

EXAMPLE 17

About 3 parts by weight of a liquid isocyanate-terminated polyurethane prepolymer, which is produced by reacting toluene diisocyanate (80% 2,4-isomer and 20% 2,6-isomer) with a trifuntional polypropylene (average mol. wt. about 4000) to obtain a trifunctional polyurethane prepolymer having 2.7% NCO groups, are added to 1 part by weight of fine granular hydrated silica and mixed, then heated to 40° C. to 80° C. for 10 to 30 minutes thereby producing a poly(urethane silicate) prepolymer. About 1 part by weight of water, containing 10% sodium dioctyl sulfosuccinate, 0.05% dimethyl ethanol amine and 0.5% paraffin oil, are mixed with the prepolymer then gently agitated for 3 to 15 minutes until the mixture begins to expand, thereby producing a semi-rigid, tough, poly(urethane silicate) fine cellular solid product.

EXAMPLE 18

About 4 parts by weight of a liquid isocyanate-terminated polyurethane prepolymer, produced by reacting polypropylene glycol (mol. wt. 450 to 500) with toluene diisocyanate in an NCO/OH molar ratio of about 2:1, is added to 1 part by weight of monosodium silicate as produced in Example 11 and is mixed then heated to 40° C. to 80° C. while agitating at ambient pressure for 10 to 30 minutes thereby producing poly(urethane silicate) prepolymer. About 0.5 part by weight of poly(alpha-methyl styrene) polymer is thoroughly mixed with the prepolymer; then about 1 part by weight of water (containing 2% by weight of ammonium oleate and 0.5% by weight of paraffin oil, and 0.5 part by weight of a liquid polysulfide polymer) is added to the prepolymer. The mixture is thoroughly mixed; the mixture is allowed to set for 3 to 15 minutes, thereby producing a tough, white poly(urethane silicate) solid elastomer product.

EXAMPLE 19

About 2 parts by weight of a liquid isocyanate-terminated polyurethane prepolymer, produced by the reaction of a liquid hydroxy-terminated polybutadiene with 2,4-tolylene diisocyanate and which has a free NCO content of about 4%, is added to a mixture of 0.5 part by weight of granular sodium metasilicate pentahydrate and 0.5 part by weight of fine granular hydrated silica and mixed. The mixture is heated to 40° C. to 80° C. while agitating for 10 to 30 minutes thereby producing a poly(urethane silicate) prepolymer. About 0.5 part by weight of water containing 2% by weight of soap is added to the prepolymer and thoroughly mixed and let stand for 12 to 24 hours, thereby producing a poly(urethane silicate, solid elastomer product. The product is further cured by heating at 70° to 80° C. for 3 to 4 hours.

EXAMPLE 20

About 3 parts by weight of moist silicic acid gel, 20 parts by weight of glycerol, and 0.3 part by weight of sodium carbonate are mixed then heated to just above the melting temperature of phthalic anhydride for 30 to 60 minutes thereby producing a polymer. About 3 parts by weight of toluene diisocyanate are added to the polymer while agitating for 10 to 30 minutes thereby producing a poly(urethane silicate) prepolymer. About 1 part by weight of granular sodium metasilicate pentahydrate is added to the prepolymer then heated to 40° C. to 80° C. for 10 to 30 minutes while agitating. About 1 part by weight of water, containing 10% by weight of sodium dioctyl sulfosuccinate, is added to the mixture and gently agitated for 5 to 15 minutes until the mixture begins to expand. It expands 5 to 7 times its orginal volume thereby producing a tough, tan, rigid poly(urethane silicate) cellular solid product. The product is soluble in organic solvents such as acetic acid and may be used as a coating agent to protect wood.

EXAMPLE 21

About 3 parts by weight of fine granular silicic acid gel, 3 parts by weight of 1,4-butanediol and 0.5 part by weight of sodium carbonate are mixed then heated to just below the boiling point of 1,4-butanediol for 20 to 60 minutes, thereby producing a light tan powder, 1,4-butanediol silicate.

About 1 part by weight of 1,4-butanediol silicate, 2 parts by weight of castor oil and 3 parts by weight of toluene diisocyanate are mixed then agitated for 10 to 30 minutes thereby producing a poly(urethane silicate) prepolymer.

About 1 part by weight of powdered cement is added to 2 parts by weight of the prepolymer then heated to 40° to 80° C. while agitating for 10 to 30 minutes. About 0.5 part by weight of water is added to the mixture then gently agitated for 3 to 15 minutes while heating the mixture to 80° to 100° C. thereby producing a rigid, tough, poly(urethane silicate) cellular solid product.

Although specific materials and conditions were set forth in the above Examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of poly(urethane silicate) solid or cellular solid products by the following steps:
    (a) adding 2 to 6 parts by weight of a liquid isocyanate-terminated polyurethane prepolymer to 1 to 2 parts by weight of a fine granular oxidated silicon compound;
    (b) heating the mixture to 40° C. to 80° C. while agitating for 10 to 30 minutes; thereby
    (c) producing a poly(urethane silicate) prepolymer;
    (d) adding 0.001% to 50% by weight, based on the weight of the polyurethane prepolymer, of a curing catalyst;
    (e) agitating the mixture for 3 to 15 minutes, thereby
    (f) producing a poly(urethane silicate) polymer.

2. The process of claim 1 wherein said liquid isocyanate-terminated polyurethane is selected from the group consisting of isocyanate-terminated polyester, isocyanate-terminated polyether, isocyanate-terminated polybutadiene, isocyanate-terminated polysulfide; isocyanate-terminated polyols, isocyanate-terminated organic polyol silicates, isocyanate-terminated organic polyester silicates and mixtures thereof.

3. The process of claim 1 wherein the oxidated silicon compound is selected from the group consisting of silica, natural occurring oxidated silicon compound containing free silicic acid or oxide groups and mixtures thereof.

4. The process of claim 1 wherein the oxidated silicon compound is first reacted with an alkali metal compound to produce an alkali metal silicate and added in step (a) of claim 1 in place of the oxidated silicon compound.

5. The process of claim 1 wherein the curing catalyst is selected from the group consisting of water, water containing 20% to 40% by weight of an alkali metal silicate, water containing 5% to 40% by weight of magnesium oxide, water containing 20% to 40% by weight of silica sol and mixtures thereof, and acetic acid.

6. The process of claim 5 wherein the curing catalyst contains a foam stabilizer in the amount up to 20% by weight.

7. The process of claim 5 wherein the curing catalyst contains an emulsifying agent in the amount up to 20% by weight.

8. The process of claim 1, wherein up to 30% by weight, based on the reaction mixture, of a chemically inert blowing agent, boiling within the range of from −25° C. to 80° C., is added to the mixture in step (d) of claim 1.

9. The process of claim 1 wherein from 10% to 50% by weight, based on the weight of polyurethane prepolymer, of a resin extender, selected from the group consisting of alpha-methylstyrene, mineral oil, coal tar, paraffin oil, sulphonated caster oil, mercapto-terminated liquid polysulfide polymer and mixtures thereof, is added to the poly(urethane silicate) prepolymer.

10. The process of claim 1 wherein 5% to 50% by weight, based on the weight of the polyurethane prepolymer of a plasticizer, selected from the group consisting of benzoate esters, phthalate esters, polyester benzoate, or mixtures thereof, is added in step (c) of claim 1.

11. The product, poly(urethane silicate) prepolymer, as produced by the process of claim 1.

12. The product, poly(urethane silicate) solid of cellular solid, as produced by the process of claim 1.

13. The process of claim 1 wherein cement, containing oxidated silicon compounds, is used in place of the oxidized silicon compound.

14. The product produced by the method of claim 13.

15. The process of claim 4 wherein the alkali metal compound is selected from the group consisting of sodium hydroxide, sodium carbonate, potassium hydroxide, potassium carbonate, lithium hydroxide and mixtures thereof.

* * * * *